United States Patent [19]

Brunn

[11] 4,455,054
[45] * Jun. 19, 1984

[54] MASTER LINK FOR TRACK CHAIN

[75] Inventor: Hansjoachim Brunn, Damme, Fed. Rep. of Germany

[73] Assignee: Firma Intertractor Viehmann GmbH & Co., Gevelsberg, Fed. Rep. of Germany

[*] Notice: The portion of the term of this patent subsequent to Nov. 30, 1999 has been disclaimed.

[21] Appl. No.: 359,710

[22] Filed: Mar. 19, 1982

Related U.S. Application Data

[63] Continuation-in-part of Ser. No. 197,124, Oct. 15, 1980, Pat. No. 4,361,364.

[30] Foreign Application Priority Data

Apr. 3, 1980 [DE] Fed. Rep. of Germany ....... 3013026

[51] Int. Cl.³ ............................................ B62D 55/20
[52] U.S. Cl. .................................... 305/58 R; 305/54
[58] Field of Search ................... 305/58 R, 54; 59/84

[56] References Cited

U.S. PATENT DOCUMENTS

| 1,980,126 | 11/1934 | Williams | 59/84 |
|---|---|---|---|
| 2,894,770 | 7/1959 | Payne | |
| 3,020,096 | 2/1962 | Strnad | 305/58 R |
| 3,511,511 | 5/1970 | Voitik | |
| 3,659,112 | 4/1972 | Stedman | 305/58 R |
| 3,853,360 | 12/1974 | Khuntia | 305/58 R |
| 4,361,364 | 11/1982 | Brunn | 305/58 R |

OTHER PUBLICATIONS

Publication, Machine Design, Jun. 11, 1964, p. 1 (Magazine).

Primary Examiner—David A. Scherbel
Attorney, Agent, or Firm—Karl F. Ross

[57] ABSTRACT

A master link for a track chain has two parallel cheeks each split into a pair of mutually complementary parts with mating teeth having undercut flanks which in the tensioned chain urge them into firmer engagement with each other. The teeth have concentric arcuate ridges with a center of curvature lying beyond the axis of a pintle interconnecting the two cheeks at their ends. A track shoe or bottom plate is fastened, with some relative play in the longitudinal direction of the link, by respective bolts to the otherwise unconnected link parts.

9 Claims, 4 Drawing Figures

MASTER LINK FOR TRACK CHAIN

CROSS-REFERENCE TO RELATED APPLICATION

This is a continuation-in-part of my copending application Ser. No. 197,124 filed Oct. 15, 1980, now U.S. Pat. No. 4,361,364.

FIELD OF THE INVENTION

My present invention relates to a master link for a track chain, designed to facilitate its emplacement on or removal from sprocket wheels of a piece of machinery, especially a heavy-duty vehicle such as a tractor.

BACKGROUND OF THE INVENTION

A conventional master link of the type here considered, e.g. as described in U.S. Pat. No. 3,659,112, generally comprises two parallel members or cheeks which are similar to those of the remaining links of the chain except for being each split into a pair of separate parts. The two cheeks are held together, as well as coupled to the cheeks of neighboring links, by transverse connectors or pintles usually formed from tightly interfitted pins and bushings; these pintles define pivotal axes for a relative swinging of adjoining links. The master link ought to be at least as strong as the other links of the chain. In prior constructions, such as that described in the above-mentioned U.S. Pat. No. 3,659,112, the separable parts of each cheek of the master link have inter-engaging teeth of triangular profile with oppositely sloping flanks and with arcuate ridges centered on one of the swing axes of the master link. The parts of each cheek are interconnected by clamping bolts extending parallel to the swing axes and traversing one part while being threaded into the other. These bolts are subjected to great stresses from shear forces acting in the longitudinal direction of the link as well as from tensile stresses due to the camming action of the triangular tooth profiles. This calls for relatively large bolt diameters which, in turn, require correspondingly wide bores tending to weaken the structure of the link parts.

OBJECT OF THE INVENTION

It is, therefore, the object of my present invention to eliminate the aforedescribed drawbacks in a master link for a track chain.

SUMMARY OF THE INVENTION

I realize this object, in accordance with my present invention, by providing each of the separable parts of each cheek of the master link with one or more teeth projecting from a contact surface perpendicular to the pivotal axes of the pintles by which this master link is swingably coupled to the adjoining links of the chain, the teeth of each pair having undercut flanks urging them into firmer engagement with each other under a tension acting longitudinally upon the chain. A bottom plate or track shoe is fastened to the four link parts by respective bolts extending parallel to the aforementioned contact surfaces; when these bolts (or some of them) are removed and the tension is relaxed, the link parts can be disengaged since they are not being held together by anything else. The undercut flanks are preferably inclined to the axial direction of the pintles at an angle between about 5° and 10°.

The mating teeth of each pair of link parts may have concentrically curved ridges which are concave toward one of the pivotal axes of the master link, as known per se, but preferably with a center of curvature located on a more remote swing axis such as that at the far end of an adjoining link. Especially in chains with relatively short links, an even farther pivotal axis may be chosen. The flatter curvature of the ridges facilitates the interfitting of the undercut flanks by a rotary motion about the remote fulcrum.

Advantageously, each bolt passes with clearance through an aperture in the track shoe of the master link while being threaded into a bore of a respective link part. Since these bolts do not have to resist a camming action tending to disengage the mating link parts from each other, they can be relatively small and may be received in blind rather than throughgoing bores so as not unduly to weaken the structure of the link parts. The clearance referred to prevents these bolts from exerting any significant stress upon the link teeth or vice versa.

According to another advantageous feature of my invention, the link parts are provided with abutments each contacting an end face of the respective other link part in the assembled state. These abutments may be disposed in the regions of the threaded bores of the link parts as reinforcements therefor.

BRIEF DESCRIPTION OF THE DRAWING

The above and other features of my invention will now be described in detail with reference to the accompanying drawing in which.

SPECIFIC DESCRIPTION

Figure 1:
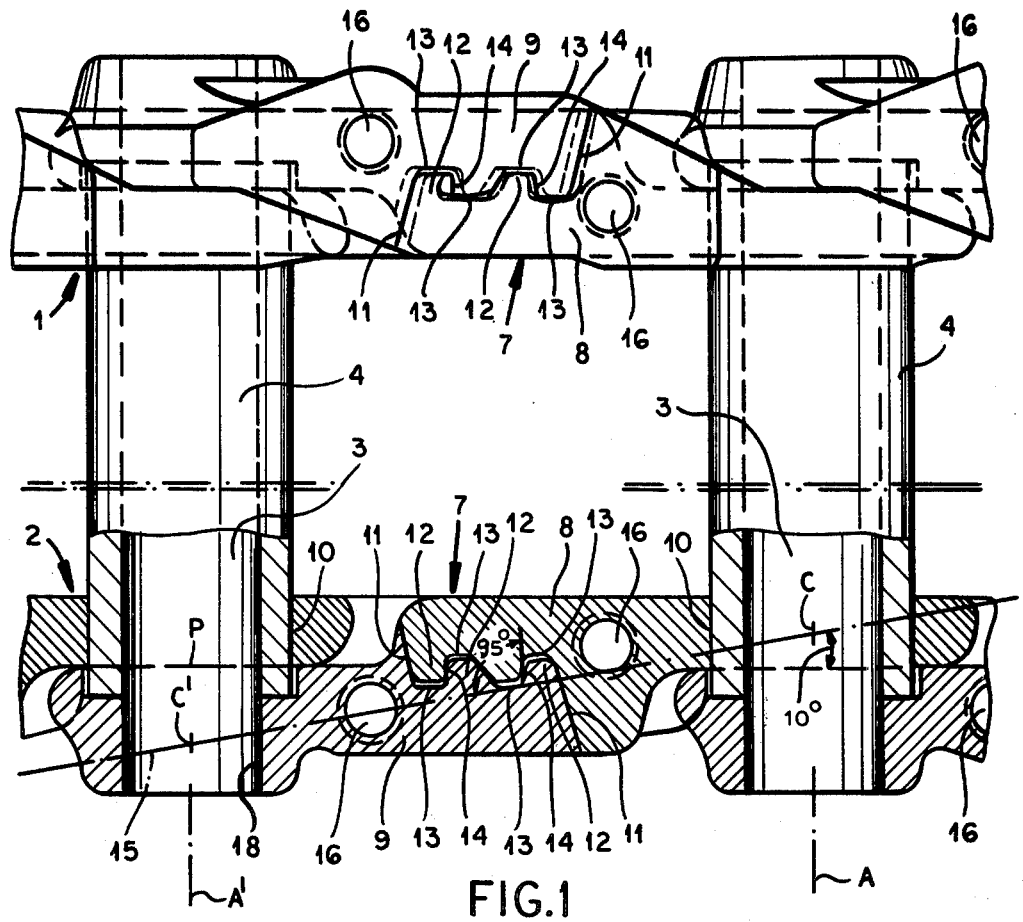
FIG. 1 is a partly sectional top view of part of a track chain including a master link according to my invention.
Figure 2:
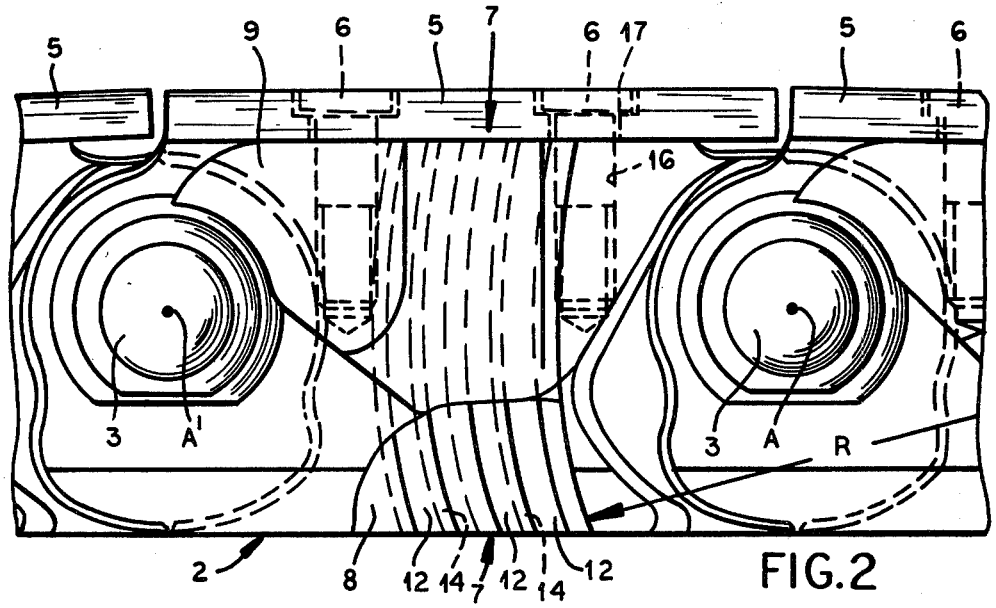
FIG. 2 is a side view of the structure of FIG. 1.

As shown in FIGS. 1 and 2, a track chain according to my present invention has a succession of standard links with parallel cheeks 1 and 2 joined together by pintles consisting of inner pins 3 which are force-fitted into outer bushings 4. A bottom plate or track shoe 5 is bolted to the cheeks 1 and 2 of each ordinary link as well as to cheeks 7 of an associated master link swingably coupled thereto by two of these pintles defining respective pivotal axes A and A'. Each cheek 7 is formed by an inner link part 8, swingable about axis A, and an outer link part 9, swingable about axis A', of mutually complementary shapes. The bushings 4 have ends firmly seated in bores 10 of the inner link parts 8 while the projecting extremities of pins 3 are similarly seated in bores 18 of the outer link parts 9. The parts 8 and 9 have abutments contacting the ends of their mates along faces 11 generally parallel to the axes A, A'.

Each of the parts 8 and 9 further has a contact surface perpendicular to axes A, A' formed with two teeth 12 that are matingly received in respective grooves 13 of the other part, the teeth and grooves having generally trapezoidal profiles with undercut flanks 14 and rounded corners opposite these flanks. Each tooth flank 14 is inclined at an acute angle of about 5° to the directions of pivotal axes A, A' while including an angle of about 85° on one side and 95° on the other side with an imaginary force line 15 interconnecting centers C, C' of the right-hand bore 10 and the left-hand bore 18 between which the chain tension is transmitted through the master link. Thus, line 15 includes an angle of about 10° with a longitudinal plane P in line with the contact surfaces of the two link parts 8 and 9.

Each part 8 and 9 has a threaded blind bore 16 receiving a respective bolt 6 by which the bottom plate or track shoe 5 of the master link is fastened to the cheeks 7. The shoe is provided with four somewhat larger unthreaded apertures 17 overlying the bores 16, the bolts 6 traversing the apertures 17 with clearance so as to allow a certain shifting of the link parts 8, 9 relative to each other and to plate 5. The teeth 12 can therefore interengage without external constraint under the camming action of their flanks 14 urging the parts 8 and 9 into closer mutual contact. Thus, as the tension in the chain increases, the grip of the teeth 12 on each other will be intensified. The teeth 12 are machined to close tolerances but can undergo limited elastic deformation to compensate for possible imprecisions in their fit.

Figure 3:
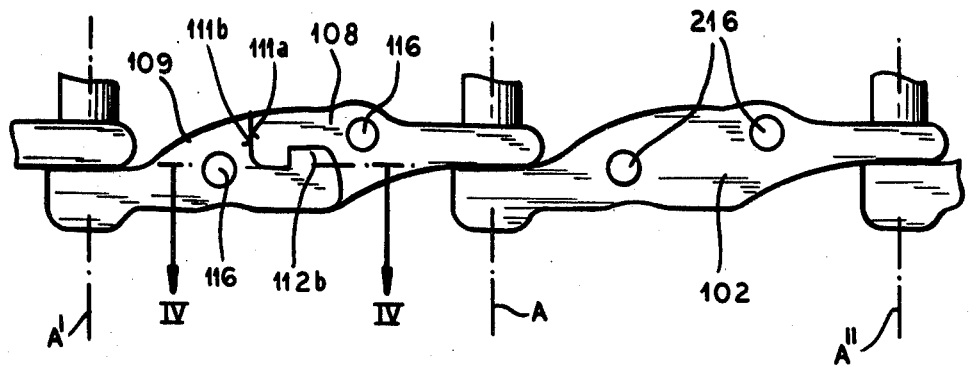
FIG. 3 is a top view similar to that of FIG. 1, showing a modification.

As clearly shown in FIG. 2, the teeth 12 have ridges which are concentric with one another and with the associated grooves 13, their arcs being concave toward the right-hand axis A. It will also be noted that their radius of curvature R considerably exceeds their distance from that axis so that their center of curvature lies to the right thereof, e.g. in line with the remote pivotal axis of the immediately adjoining link designated A" in FIGS. 3 and 4. These latter Figures show one of the cheeks of a modified master link with parts 108, 109 each having only one tooth 112a, 112b engaged in a respective groove of the other link part. A cheek 102 of the adjoining link, hinged to master-link cheek 108, 109, has essentially the same configuration as the latter except for being unitary; its bores 216, engageable by bolts serving to fasten a corresponding track shoe thereto, have the same relative position and spacing as the bores 116.

Figure 4:
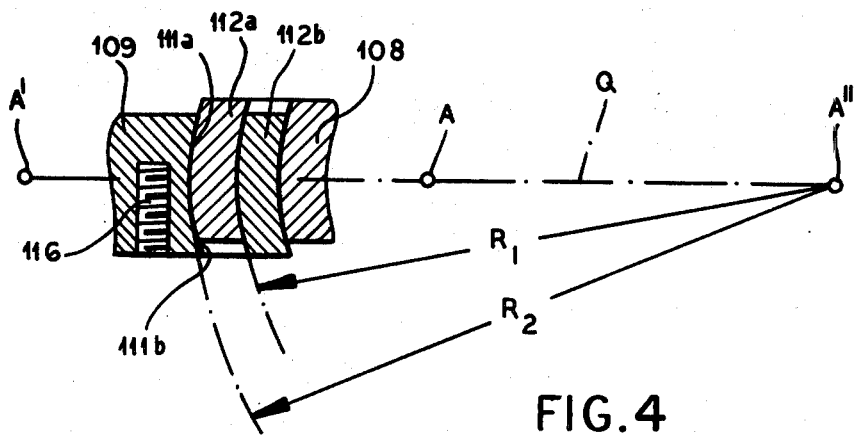
FIG. 4 is a fragmentary sectional view taken on the line IV—IV of FIG. 3.

In FIG. 4 I have shown the contacting undercut flanks of teeth 112a, 112b curved about axis A" with a radius $R_1$ while contact faces 111a, 111b of the two link parts follow a similar arc with radius $R_2$. Face 111b, however, deviates slightly inward from that arc at one end of the groove accommodating the tooth 112a so that this groove is slightly constricted and exerts an elastic wedging effect upon the tooth when the link part 108 is swung counterclockwise into engagement with its mate 108. This mode of fit insures a continued clamping of the two link parts to each other so as to prevent any separation thereof even if the associated track shoe (omitted in FIGS. 3 and 4) should become detached. The interfitting swing will take place with the pivotal axes A, A', A" situated in a common plane Q which may be tangent to the periphery of a sprocket wheel engaged by the chain.

The narrowing of at least one of the tooth-receiving grooves at an extremity thereof may, of course, also be used in the embodiment of FIGS. 1 and 2.

I claim:

1. A master link for a track chain, comprising:

two parallel cheeks interconnected at their ends by respective pintles coupling same to adjoining chain links for relative swinging about pivotal axes transverse to said cheeks, each of said cheeks being split into a pair of separable link parts with mating teeth projecting from contact surfaces perpendicular to said pivotal axes and having undercut flanks urging said teeth of each pair of link parts into firmer engagement with each other under a tension acting longitudinally upon said cheeks; and a track shoe fastened to all said link parts by respective bolts extending parallel to said contact surfaces, said link parts being disengageable from each other upon a removal of said bolts and relaxation of said tension.

2. A master link as defined in claim 1 wherein each of said bolts passes with clearance through an aperture in said track shoe and is threaded into a bore of a respective link part.

3. A master link as defined in claim 1 or 2 wherein said teeth have concentrically curved ridges which are concave toward one of said pivotal axes.

4. A master link as defined in claim 3 wherein said ridges have a center of curvature located beyond said one of said pivotal axes on a swing axis of another link of the chain.

5. A master link as defined in claim 3 wherein one link part of each pair has an end face defining with a tooth of said one link path an arcuate groove accommodating a tooth of the other link part thereof for enabling an interfitting of said link parts by a swing about a common center of curvature, said end face deviating slightly from concentricity with said teeth at an end of said groove for resiliently clamping said tooth of the other link part at an end of the interfitting swing.

6. A master link as defined in claim 1 or 2 wherein said teeth have generally trapezoidal profiles with rounded corners opposite said undercut flanks.

7. A master link as defined in claim 1 or 2 wherein said undercut flanks include an angle between substantially 5° and 10° with the axial direction of said pintles.

8. A master link as defined in claim 1 or 2 wherein one link part of each pair has an abutment in contact with an end face of the respective other link part, said end face being generally parallel to said pivotal axes.

9. A master link as defined in claim 8 wherein each abutment lies in a region of a threaded bore of the respective link part receiving one of said bolts.

* * * * *